United States Patent [19]
Sandstrom

[11] Patent Number: 6,002,663
[45] Date of Patent: Dec. 14, 1999

[54] HUBLESS OPTICAL DISC HAVING LOW RADIAL RUNOUT AND METHOD OF MANUFACTURE

[75] Inventor: Chad R. Sandstrom, Stillwater, Minn.

[73] Assignee: Imation Corp., Oakdale, Minn.

[21] Appl. No.: 08/839,933

[22] Filed: Apr. 17, 1997

[51] Int. Cl.⁶ .............................. G11B 3/70; G11B 25/00
[52] U.S. Cl. ......................................... 369/282; 369/271
[58] Field of Search .................................... 369/180, 195, 369/206, 258, 270, 271, 272, 275, 280, 282, 290; 360/133, 135; 425/3

[56] References Cited

U.S. PATENT DOCUMENTS

| | | | |
|---|---|---|---|
| 4,351,047 | 9/1982 | Redlich et al. | 369/270 |
| 4,785,444 | 11/1988 | Nakane et al. | 369/282 |
| 4,910,624 | 3/1990 | Peeters | 360/133 |
| 5,072,438 | 12/1991 | Suzuki et al. | 369/290 |
| 5,125,750 | 6/1992 | Corle et al. | 359/819 |
| 5,202,880 | 4/1993 | Lee et al. | 369/275.4 |
| 5,326,240 | 7/1994 | Kudo et al. | 425/3 |
| 5,470,627 | 11/1995 | Lee et al. | 428/64.4 |
| 5,487,926 | 1/1996 | Kuribayashi et al. | 428/33 |
| 5,582,891 | 12/1996 | Murakami et al. | 428/64.1 |
| 5,644,564 | 7/1997 | Peters | 369/270 |
| 5,673,250 | 9/1997 | Mieda et al. | 369/275 |

FOREIGN PATENT DOCUMENTS

| | | |
|---|---|---|
| 0 566 032 A2 | 10/1993 | European Pat. Off. . |
| 6-20303 | 1/1994 | Japan . |
| 6-168560 | 6/1994 | Japan . |
| 7-110996 | 4/1995 | Japan . |
| 7-182818 | 7/1995 | Japan . |
| 8-22639 | 1/1996 | Japan . |
| 8-77610 | 3/1996 | Japan . |
| 8-203129 | 8/1996 | Japan . |
| 8-247137 | 9/1996 | Japan . |

*Primary Examiner*—David L. Ometz
*Assistant Examiner*—Angel Castro
*Attorney, Agent, or Firm*—Eric D. Levinson

[57] ABSTRACT

Hubless optical disc having low radial runout. The optical disc is capable of containing a high capacity of information therein. The optical disc includes a disc substrate having a formatted surface. A mechanism is provided within the disc substrate for mating the optical disc with a drive spindle, wherein the formatted surface is concentrically registered relative to the mechanism within the disc substrate. In one embodiment, the mechanism may comprise an annular groove, annular ridge, or a plurality of holes molded in the disc substrate. The present invention includes optical tooling for forming the hubless optical disc having low radial runout. The present invention further includes an optical disc player drive spindle capable of mating with the high-capacity hubless optical disc.

38 Claims, 8 Drawing Sheets

HUBLESS OPTICAL DISC HAVING LOW RADIAL RUNOUT AND METHOD OF MANUFACTURE

TECHNICAL FIELD

The present invention relates generally to the field of optical data discs, and in particular, to a hubless optical disc having a low radial runout error and method of manufacturing such a disc.

BACKGROUND OF THE INVENTION

Optical data discs are a popular media choice for the distribution, storage and accessing of large volumes of data. This includes audio and video program material, as well as computer programs and data. Formats of optical data discs include audio CD (compact disc), CD-R (CD-readable), CD-ROM (CD-read only memory), DVD (digital versatile disc or digital video disc) media, DVD-RAM (random access memory), various types of rewritable media, such as magneto-optical (MO) discs, and phase change optical discs. In general, optical discs (such as CD-ROMs) are produced by making a master which has physical features representing the data formed in or on a reference surface therein. The master is used to make a stamper, which, in turn, is used to make production quantities of replica discs, each containing the data and tracking information which was formed in the master. The high data capacity, convenience, and relatively low production costs of such discs have contributed to their great success and acceptance in the marketplace.

In optical discs, data is stored as a series of lower reflectance "pits" embossed within a plane of higher reflectance "lands". The microscopic pits are formed on the surface of the plastic disc when the material is injected into a mold. Typically, the pitted side of the disc is then coated with a reflectance layer, such as a thin layer of aluminum, and in the case of a CD, followed by a protective layer of lacquer. The pits on an optical disc can be arranged in a spiral track originating at the disc center hub and ending at the disc outer rim. The data can also lie in a series of concentric tracks spaced radially from the center hub.

To read the data on an optical disc, an optical disc player shines a small spot of laser light through the disc substrate onto the data layer as the disc rotates. The intensity of the light reflected from the disc's surface varies according to the presence (or absence) of pits along the information track. When a pit lies directly underneath the "readout" spot, much less light is reflected from the disc than when the spot is over a flat part of the track. A photodetector and other electronics inside the player translate this variation into the 0s and 1s of the digital code representing the stored information.

As optical disc technology has evolved, optical discs have increased in storage capacity. Higher density discs have resulted in the storage of a greater amount of information within the same size of disc area. For example, a CD having a storage capacity of 0.65 gigabytes has data pits which are 0.83 $\mu$m long and has a track pitch (the distance between data tracks) of approximately 1.6 $\mu$m. In comparison, a DVD disc data pit is as small as 0.4 $\mu$m long, and a track pitch of only 0.74 $\mu$m, resulting in a storage capacity of 5 gigabytes on a single layer. Similarly, MO and phase change disc track pitch varies with the density or storage capacity of the disc.

To read high capacity optical discs having smaller pits and a smaller track pitch, the optical disc player's read beam must achieve a smaller spot focus. Further, data must be more precisely located on the optical disc substrate. Ideally, the data tracks are concentrically located about the center hole of the disc. During the optical disc manufacturing process, a centering error is introduced into the radial positioning of the data tracks (or track cycles) on the optical disc. This error is known as radial total indicated runout (RTIR). RTIR is defined as the measure of non-concentricity of the data tracks to the drive spindle on the optical disc player.

In a conventional optical disc manufacturing process, RTIR error is introduced during the injection molding process. The injection molding process begins with a tooling mechanism. The optical tooling mechanism includes a fixed side and a moving side. The moving side typically includes a stamper for replicating data and format information into the disc substrate, and a movable gate cut for cutting a central opening in these disc substrates. The stamper is located by an inner holder, wherein the inner holder fits over the stamper. Several more parts are located at the center inside diameters of the tool. In typical optical tooling, all of these parts need to remain concentric between the gate cut and the removable inner holder for concentric registration (or centering) of the format information in the disc substrate relative to the central opening or central hole.

In a disc molding process, a resin, typically polycarbonate, is forced in through a sprue channel into a substrate cavity within the optical tooling (mold) to form the optical disc substrate. The format of the grooves and pits are replicated in the substrate by the stamper as the cavity is filled. After filling, the gate cut is brought forward to cut a center hole in the optical disc. After the part has sufficiently cooled, the optical tooling mold is opened and the sprue and product eject are brought forward for ejecting the formed optical disc off of the stamper. The inner holder may be removed to allow change out of the stamper.

Any misalignment of the aforementioned optical tooling results in the replication of greater RTIR error in the molded disc. Further, any debris, flash or other imperfections resulting from the gate cut action, and any misalignment of the moving stamper relative to the fixed side of the optical tooling will add to the RTIR error. When track pitch is larger, such as in CD optical discs, the disc reader will read CD optical discs having typical RTIR errors between 50 and 100 $\mu$m due to a relatively large track pitch (1.6 $\mu$m). For higher capacity discs, such as DVD discs, it is difficult (or impossible) for an optical reader to read a DVD optical disc having an RTIR error greater than 50 $\mu$m, due to the smaller track pitch. Similar problems exist with MO disc technology having a typical RTIR between 20 and 30 $\mu$m.

In order to reduce the RTIR error to acceptable (or readable) levels, hubs are installed within the center opening of the optical disc. A new center is located, and the hub is installed centered on the disc relative to the formatted data tracks. This is typically accomplished using a costly centering process. Further, the hub itself is insert molded, resulting in a high expense relative to the total disc cost.

It is desirable to have a high density optical disc having a low RTIR error which does not require the use of a hub for centering the drive to the information on the disc. It is desirable to have a high density optical disc which may be mounted and centered on features molded into the plastic substrate of the disc. Further, it is desirable to have a disc molding process for forming high capacity optical discs which may include simple modifications to conventional optical tooling, and which introduces low RTIR error into the disc substrate.

SUMMARY OF THE INVENTION

The present invention includes a high-capacity optical disc having a low RTIR error and which does not require the use of a hub for centering the information on the disc. The present invention also includes a disc molding process for forming high capacity optical discs which includes optical tooling which introduces low RTIR error into the disc substrate.

In one embodiment, the present invention includes a hubless optical disc for storage of information therein. The optical disc includes a disc substrate having a formatted surface and a central portion, wherein the formatted surface includes a plurality of generally concentric tracks, and wherein each track can be defined as a concentric ring or a cycle of a spiral track, and wherein the central portion is proximate the center of the disc substrate, and the formatted surface surrounds the central portion. A disc alignment mechanism is located within the central portion, such that the concentric registration of the formatted information is specified relative to the disc alignment mechanism. The disc alignment mechanism may be integrally molded within the disc substrate or formed separate from the disc substrate and coupled to the disc substrate.

The disc alignment mechanism may be matable with an optical disc player drive spindle. The disc alignment mechanism may include an annular groove in the disc substrate, an annular ridge extending from the disc substrate, or a plurality of holes in the disc substrate. The optical disc may further include a central hole within the disc substrate, wherein the central hole extends through the central portion of the disc substrate. The optical disc may further include means for aiding and coupling the optical disc to an optical disc player drive spindle, wherein the means for coupling is secured across the opening.

In another embodiment, the present invention includes a hubless optical disc capable of storage of a high capacity of information, the hubless optical disc having a low radial total indicated runout error. The hubless optical disc includes a generally disc shaped substrate having a central hole. The disc substrate includes a formatted information area in a central portion, wherein the central portion is located between the central hole and the formatted disc substrate. Means are located within the central portion for concentric registration of the formatted information, including a disc alignment mechanism, wherein the concentric registration of the formatted information is specified relative to the disc alignment mechanism.

The means for concentric registration of the formatted information may be matable with an optical disc player drive spindle. The means for concentric registration may be integrally molded within the disc substrate or formed separate from the disc substrate and coupled to the disc substrate. The disc alignment mechanism may include an annular groove in the disc substrate, an annular ridge extending from the disc substrate, or a plurality of holes in the disc substrate. The optical disc may further comprise means for aiding and coupling the optical disc to an optical disc player drive spindle, wherein the means for coupling is secured across the opening.

In another embodiment, the present invention includes an optical disc capable of storage of a high capacity of information. The optical disc includes a disc substrate. A formatted surface is located within the disc substrate capable of containing data therein. The formatted surface includes a plurality of data tracks, the formatted surface having a track pitch of less than 0.74 $\mu$m, and a low radial total indicated runout error of less than 50 $\mu$m.

It is recognized that the formatted surface may have a track pitch of less than 0.74 $\mu$m and a radial total indicated runout error of less than 30 $\mu$m. In one preferred embodiment, the track pitch is 0.37 $\mu$m or less.

Each data track may be defined as a cycle of a continuous spiral track, or each data track may be defined as a concentric track. The disc may have a capacity of greater than 20 gigabytes.

The disc substrate may include a disc alignment mechanism, wherein the concentric registration of the formatted information is specified relative to the disc alignment mechanism. The optical disc may include a central portion located between the center of the disc and the formatted surface, wherein the disc alignment mechanism is located within the central portion.

In another embodiment, the present invention includes a hubless optical storage system, including an optical disc drive and an optical media having a low radial total indicated runout. The optical media includes a disc substrate having a formatted surface in the central portion, wherein the central portion is proximate the center of the disc substrate and the formatted surface surrounds the central portion. A disc alignment mechanism is located within the central portion such that the concentric registration of the formatted information is specified relative to the disc alignment mechanism. The drive comprises a drive spindle having a mating mechanism for mating the drive with the optical media, the mating mechanism including a coupling mechanism formed on the drive spindle capable of mating with the disc alignment mechanism.

The disc alignment mechanism may include an annular ridge, and the coupling mechanism may include an annular groove capable of receiving the annular ridge. Alternatively, the coupling mechanism may include an annular ridge, and the disc alignment mechanism may include an annular groove capable of receiving the annular ridge.

The optical storage system may further include a mechanical hold-down, wherein the disc substrate is interposed between the drive spindle and the mechanical hold-down. The mechanical hold-down may apply a force normal to the disc substrate. Means are provided which are coupled to the mechanical hold-down for applying a force normal to the disc substrate. In one embodiment, the force is an electromagnetic force. The optical storage system may further include a vacuum mechanism for urging the disc substrate towards the drive spindle. The vacuum mechanism may include an opening in the drive spindle.

In another embodiment, the present invention includes a disc molding apparatus for forming an optical disc in a disc molding process. The disc molding apparatus includes a disc substrate cavity for forming a disc substrate therein. A sprue mechanism can be in fluid communication with the disc substrate cavity for allowing disc material to enter the disc substrate cavity. A removable stamper may be located on one side of the disc substrate cavity for forming formatted data into the disc substrate. Means may be provided for forming a disc alignment mechanism in the disc substrate, wherein the concentricity of the formatted data is specified relative to the disc alignment mechanism.

The means for forming a disc alignment mechanism may include an inner holder. The inner holder may be releasibly mounted adjacent the stamper for releasibly locking the stamper within the disc molding apparatus.

The inner holder may include a shape imparting mechanism for stamping the disc alignment mechanism into the disc substrate. The shape imparting mechanism may include an annular ring thereon, an annular depression located therein, or a plurality of registration pins extending therefrom. In one embodiment, the shape imparting mechanism also releasably locks the stamper within the disc molding apparatus. It is also recognized that the shape imparting mechanism may be located on the stamper or other disc molding apparatus part.

In another embodiment, the present invention includes a drive spindle for use in an optical disc drive assembly. The drive spindle includes a generally cylindrical shaped body. Means are coupled to the generally cylindrical shaped body for engaging an optical disc. The means for engaging having a mating mechanism, wherein the optical disc includes a formatted surface and a disc alignment mechanism. The concentricity of the formatted surface is specified relative to the disc alignment mechanism. The mating mechanism is engageable with the disc alignment mechanism.

A central hub may extend from the generally cylindrical shaped body for extending through a center opening in the optical disc. A flange may extend from the generally cylindrical shaped body, wherein the means for engaging an optical disc is coupled to the flange. The means for engaging may be formed integral the generally cylindrical shaped body. In one embodiment, the means for engaging may include an annular ring formed thereon, an annular groove formed therein, or a plurality of pins extending therefrom.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof, and wherein.

DETAILED DESCRIPTION OF THE PREFERRED EMBODIMENTS

Figure 1:
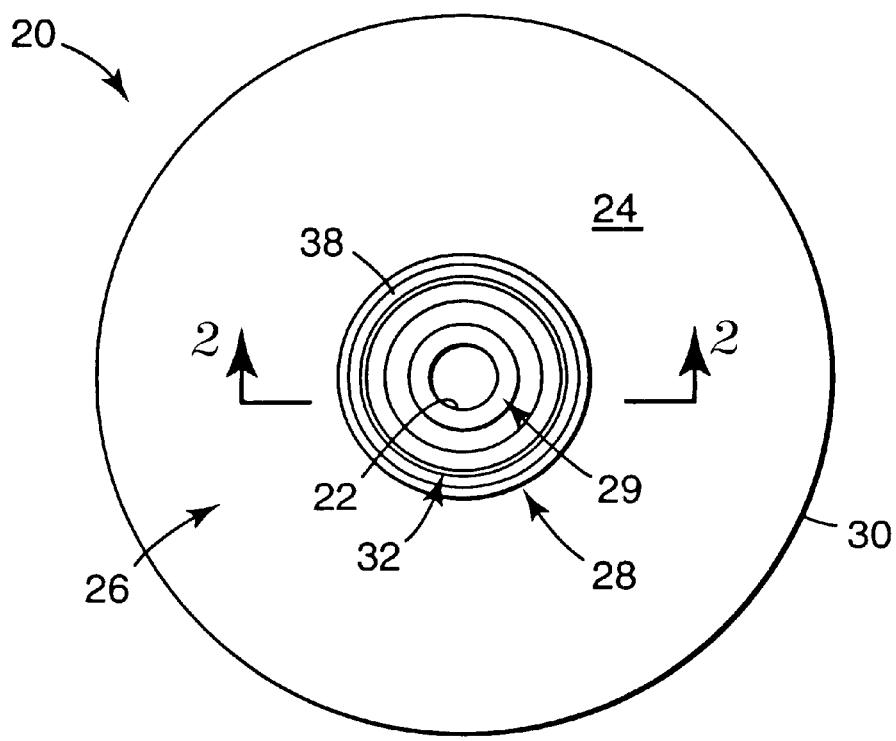
FIG. 1 is a plan view of an optical disc in accordance with the present invention.

In FIG. 1, an optical disc in accordance with the present invention is generally shown at 20. The optical disc may be a read only or a writable optical disc, such as those previously described herein. The optical disc 20 is round or generally "disc shaped", and may include an opening 22 centrally located and extending therethrough. The optical disc 20 includes a disc substrate 24, which includes an information area 26 and a central region 28. The central region 28 may be located between the information area 26 and opening 22.

As previously described herein, data is stored within the information area 26 of the optical disc 20 as a series of lower reflectance "pits" bored within a plane of higher reflectance "lands". The microscopic pits may be formed on the surface of the plastic disc during an injection molding process, which is described in detail further in the specification. The pits on the optical disc are arranged in a spiral track originating at the beginning of information area 26, adjacent central region 28, and ending at the disc outer edge 30. The spiral track can be defined as a plurality of generally concentric tracks, wherein each generally concentric track is a cycle of the spiral track. Alternatively, the information area 26 may consist of a plurality of concentric tracks. Similarly, for writable optical discs, such as magneto optical discs or phase change optical discs, the data is encoded within the readable material arranged in a spiral track. In particular, the writable discs may include a spiral or concentric track formed in the disc substrate, wherein the data is encoded in the writable material located in the regions between the spiral track cycles.

The central region 28 includes a disc alignment mechanism 32. The disc alignment mechanism 32 allows engagement or mating of the optical disc with an optical disc player (in particular, the drive spindle located within the optical disc player) for retention and rotation of the disc during operation of the optical disc player. Further, the concentricity of the formatted information located within the information area 26 is specified relative to the disc alignment mechanism 32. The disc alignment mechanism 32 serves as a disc alignment feature for centering an optical disc player drive mechanism to the formatted surface (information) on the disc (or more particularly, the generally concentric tracks).

Figure 2:
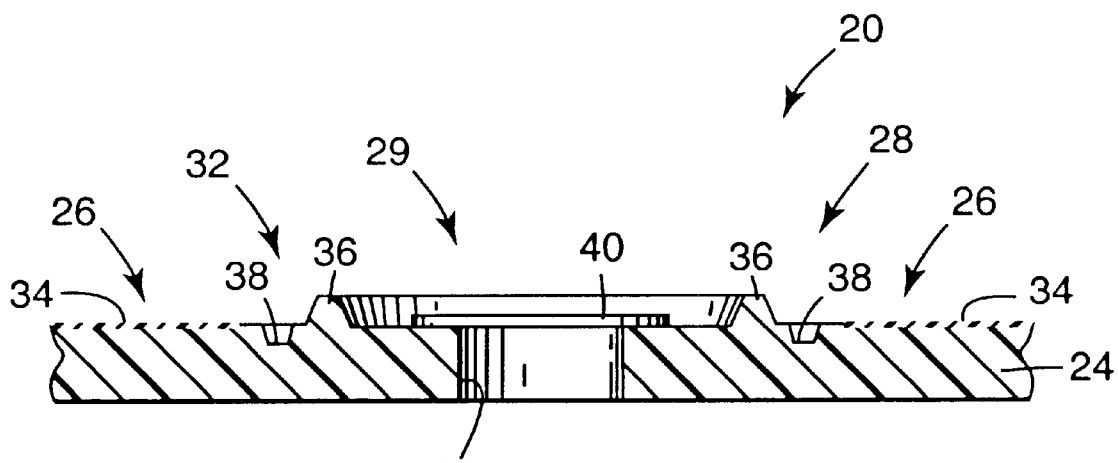
FIG. 2 is a partial cross-sectional view taken along line 2—2 of FIG. 1.

In FIG. 2 a partial cross-sectional view of the optical disc 20 taken along line 2—2 in FIG. 1 is generally shown. The disc substrate 24 includes formatted surface 34 located within information area 26. In the exemplary embodiment shown, the disc alignment mechanism 32 may be an annular member or ring 36 generally concentrically located about opening 22. Due to the alignment mechanism 32, it is not required that center hole 22 be centered relative to the formatted surface 34. The annular ring 36 extends as a molded projection from the surface of the optical disc 20. The height of the annular ring 36 relative to the disc substrate 24 is preferably less than the thickness of the disc substrate, and must be sized such that it is capable of being received or coupled to an optical disc player/drive spindle.

In one preferred embodiment, the annular ring 36 extends at least 0.5 mm above the surface of the disc substrate 24. Alternatively, it is recognized that disc alignment mechanism 32 may consist of a separately manufactured piece adhered to the disc substrate 24.

The concentricity of formatted surface 34 is specified relative to annular ring 36. Further, annular ring 36 is used for mating with the drive spindle in an optical disc player during operation of the optical disc, and for centering the optical disc player drive mechanism to the formatted surface 34. It is recognized that disc alignment mechanism 32 may be comprised of other features within the disc substrate 24 for registration of the formatted surface 34. Further, it is recognized that the central region 28 may include other indentations or projections, such as groove 38, which may be formed within the optical disc 20 as a by-product of the disc molding process. In a conventional disc molding process, the resulting groove 38 is 0.3 mm or less deep and it is not shaped such that it is capable of being received by an optical disc player/drive spindle, and as such, is not capable in itself of functioning as a disc alignment feature.

Further, it is also recognized that a member 40 may be secured across opening 22. In one exemplary embodiment, the member 40 is a metallic washer secured over the opening 22 by an adhesive. The member 40 is not required for centering of the optical disc 20 formatted surface 34 relative to a drive mechanism. The member 40 may be utilized as an aid for magnetically coupling the optical disc 20 to an optical disc player drive spindle during reading/playing/writing of the optical disc.

Since the concentricity of the data on the optical disc 20 is registered relative to the disc alignment mechanism 32, and the disc alignment mechanism 32 serves as a disc alignment feature for centering the optical disc player drive mechanism to the data (or data tracks), the optical disc 20 has a low RTIR error during reading of the disc. The data is not registered/centered relative to the disc opening 22. Further, since the optical disc 20 has a low RTIR error, a hub is not required for centering the optical disc 20 within an optical disc player. It is recognized that the disc alignment mechanism 32 may consist of other means for coupling/mating with the optical disc player, and is preferably located adjacent the formatted surface 34.

In the exemplary embodiment shown, it is recognized that since the disc alignment mechanism 32 (shown as annular ring 36) extends from the disc substrate 24, the disc alignment mechanism 32 may also be used as a stacking mechanism to aid in stacking a plurality of optical discs 20. When used as a stacking mechanism, the disc alignment mechanism 32 provides a separation between each optical disc 20, and separates the formatted surface 34 from contact with an adjacent disc.

In one exemplary embodiment, the optical disc 20 in accordance with the present invention is a high capacity optical disc which includes a disc substrate formed of a polycarbonate resin. The optical disc 20 may be a read only or writable optical disc. The disc 20 has an outside diameter of 130 mm, and includes opening 22 having a diameter of 15 mm. The annular ring 36 is located 8.3 mm from the opening 22. The annular ring 36 has a width of 1 mm and a height of 0.5 mm relative to the substrate surface. Groove 38 is located 9.6 mm from opening 22, having a width of 0.9 mm and a depth of 0.3 mm. The formatted surface 34 is located 4.0 mm from annular ring 36, and 2.9 mm from groove 38.

In this exemplary embodiment, the optical disc 20 has a track pitch of 0.35 $\mu$m, having an RTIR of 30 $\mu$m or less. The optical disc 20 may be a high-capacity optical disc, having a storage capacity greater than 20 gigabytes.

Figure 3:
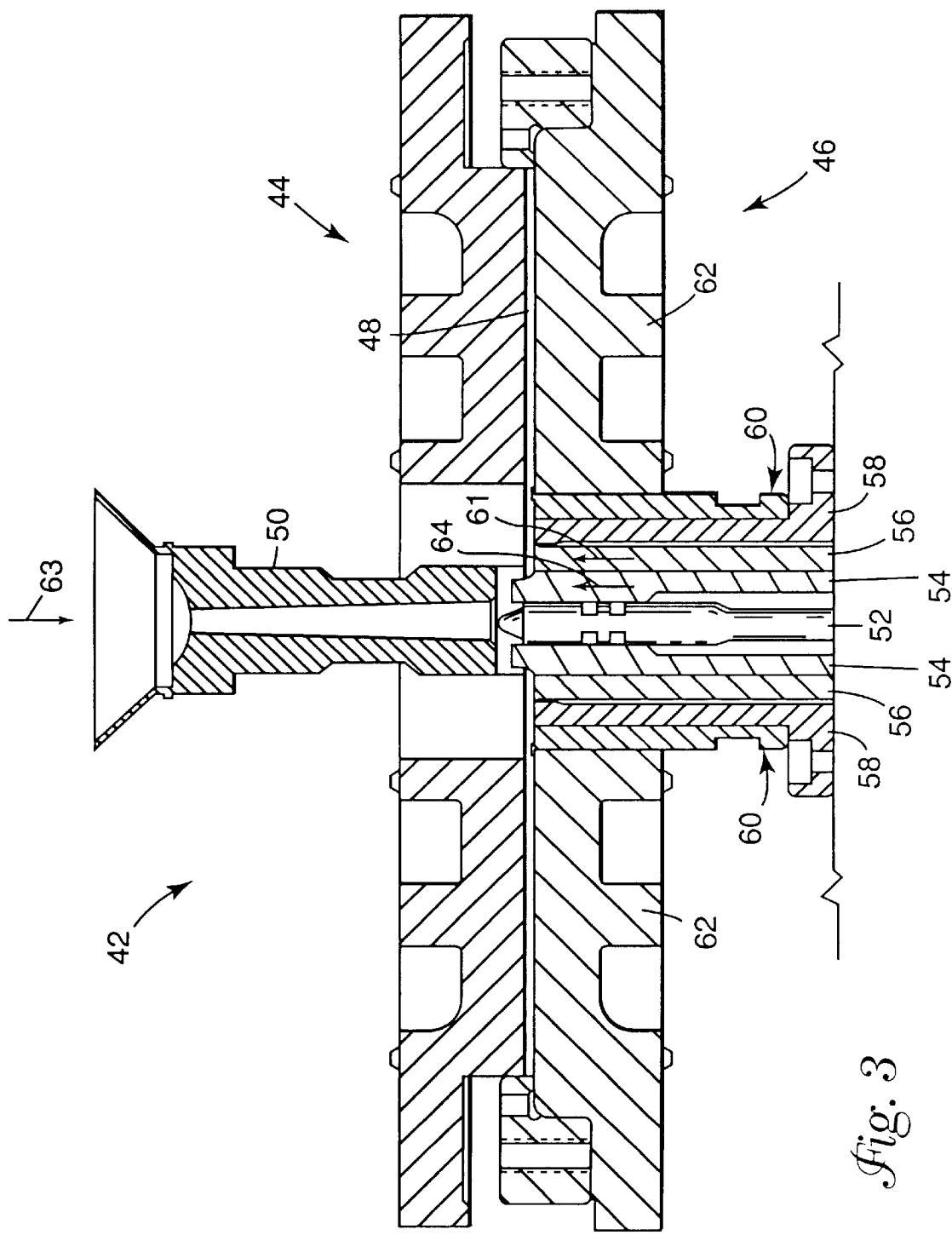
FIG. 3 is one embodiment of a tool for use in a disc molding process for producing an optical disc in accordance with the present invention.

In FIG. 3, a cross section of an optical tool for use in producing low RTIR optical discs 20 is generally shown at 42. The optical tool 42 is used for molding replicas of the optical disc 20 in a disc molding process, which can be similar to the disc molding process as previously described herein. The optical tool 42 is part of a complete optical disc molding manufacturing process (not shown), which can be a process for manufacturing CD-ROM, CVD, MO, or phase change optical discs, as previously described herein. The low RTIR optical tool 42 generally includes a fixed side 44 and a moving side 46. The fixed side 44 is movably coupled to the moving side 46 to form a disc substrate cavity 48. A sprue 50 is provided for allowing material for forming the substrate 24, such as a polycarbonate resin, to enter the disc substrate cavity 48.

The moving side 46 includes a sprue eject 52, a gate cut 54, a product eject 56, a rod cover 58, an inner holder 60 and stamper 62. Sprue eject 52 is utilized for ejection of sprue 50 during opening of the optical tool 42. Gate cut 54 is utilized for cutting the opening 22 within optical disc 20. Product eject 56 is utilized for ejecting the finished product replica optical disc 20 from the optical tool 42. Inner holder 60 is removable for changing out and securing stamper 62. Rod cover 58 is stationary within the moving side 46 to constrain the positions of the adjacent movable parts product eject 56 and the inner holder 60. Stamper 62 is utilized for forming the formatted surface 34 into optical disc 20. The stamper 62 includes data tracks. In an exemplary embodiment, for CD-ROM the stamper 62 includes tracks formed of data and pits corresponding to the data to be embossed into the information area 26 of the optical disc substrate 24 during the optical disc molding process.

The process for molding a low RTIR optical disc 20 in accordance with the present invention includes filling the disc substrate cavity 48 with a disc molding material, such as polycarbonate resin, through the sprue 50 channel (indicated at 63). After the polycarbonate resin is forced into the disc substrate cavity, but before cooling of the polycarbonate resin, the gate cut 54 is operated forward, indicated by arrow 64, to cut opening 22 within the optical disc substrate 24. After cooling of the resin within the disc substrate cavity 48, the formatted surface 34 has been embossed in optical disc 20, and the optical tool 42 is opened. The sprue eject 56 is operated forward (indicated by arrow 61). At the same time, the product eject 56 is operated to remove or eject the molded disc substrate 24 from the optical tool 42 surface (specifically, the surface of the moving side 46). During this process, the rod cover 58 remains stationary. The above process is repeated for the manufacture of each additional optical disc (or replica optical disc) substrate. The optical disc 20 then passes through a finishing process for forming additional layers over the disc substrate, such as reflective or recording layers, and in the case of CD-ROM protective layers, depending on the type and use of the optical disc.

Figure 4:
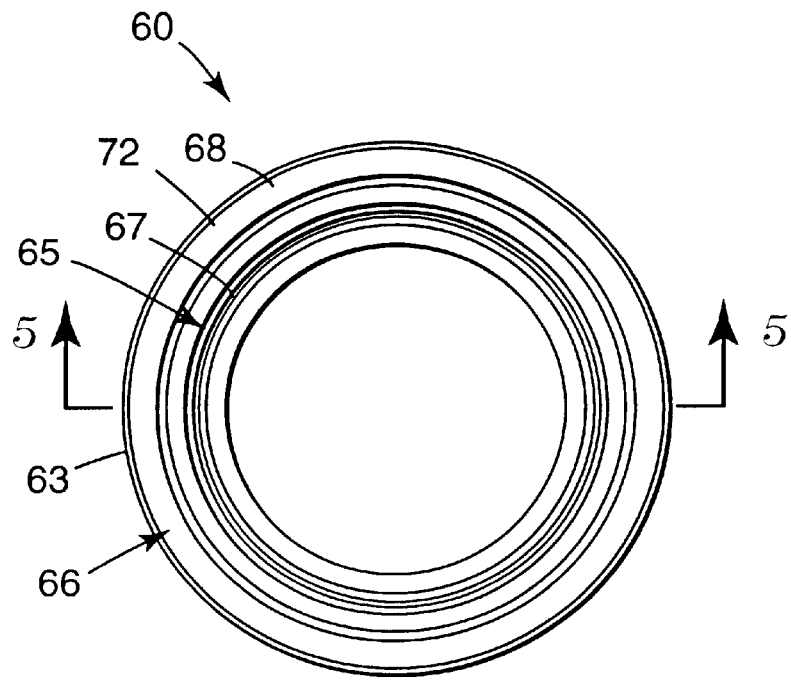
FIG. 4 is a top view of one embodiment of the inner holder shown in FIG. 3.
Figure 5:
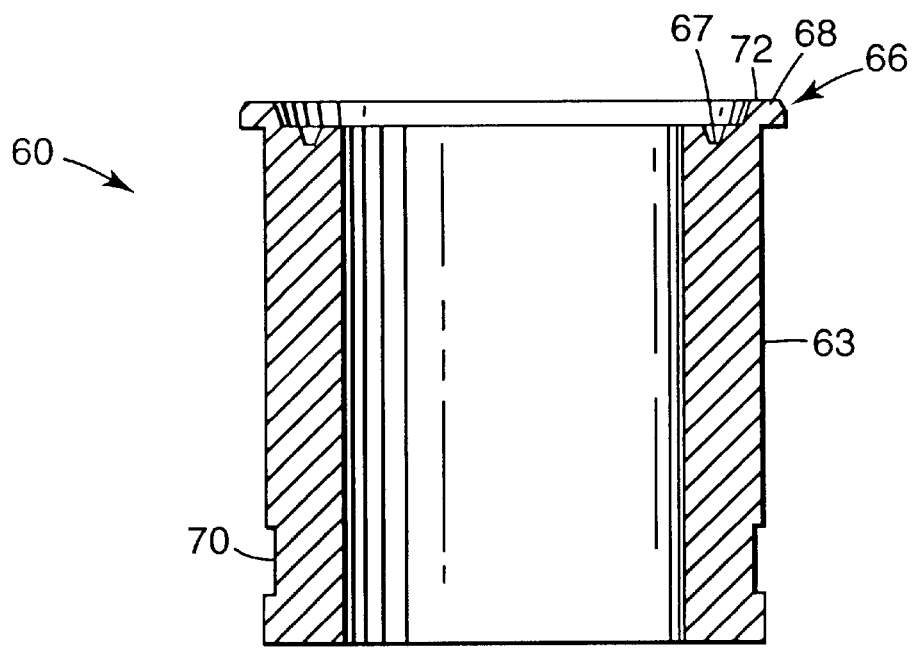
FIG. 5 is a cross-sectional view taken along line 5—5 of FIG. 4.

Referring to FIG. 4, a top view of the inner holder 60 is shown. The inner holder 60 includes a body 63, a shape imparting mechanism 65 and locking mechanism 66. The shape imparting mechanism 65 imparts a shape to the optical disc substrate 24 and the locking mechanism 66 retains the stamper 62 within optical tool 42. In the embodiment shown, the shape imparting mechanism 65 includes an annular depression 67, and the locking mechanism 66 includes an annular raised portion 68. The inner holder body 63 is generally cylindrically shaped, and is preferably formed of metal, such as stainless steel or aluminum. Referring to FIG. 5, a cross-sectional elevational view of the inner holder 60 is shown. The inner holder 60 further includes a lock down ring 70.

The inner holder 60 is secured within the optical tool 42 at the lock down ring 70. The inner holder 60 is removable from the optical tool 42 for allowing the stamper 62 to be changed out. Once a different stamper 62 is in place, the inner holder 60 is again secured to the optical tool 42 at lock down ring 70. In a locked position, the locking mechanism raised portion 68 extends over an edge of the stamper 62, securely retaining the stamper 62 in place.

In the exemplary embodiment shown, the inner holder 60 is utilized for forming the disc alignment mechanism 32 within the optical disc substrate 24. The inner holder 60 raised portion 68 and depression 67 are located along the top surface 72 of the inner holder 60. The shape of the top surface 72 is reflected into the optical disc substrate 24 during the disc molding process. Specifically, in the exemplary embodiment shown, depression 67 corresponds to form the disc alignment mechanism 32 shown as annular ring 36 and the raised portion 68 forms annular groove 38.

The unique optical tooling in accordance with the present invention produces an optical disc having a low RTIR. The stamper 62 is tightly fitted to the inner holder 60. The concentricity of the formatted information stamped into the disc substrate 24 is specified by a single metal part, such as the inner holder 60. Since the concentricity of the formatted information is specified relative to the disc alignment mechanism 32 formed by the inner holder 60, the introduction of RTIR error into the optical disc is limited to the punching of the stamper 62 and the formation of the master disc and subsequent formation of the stamper. Any debris from the gate cut action and any non-concentricity or misinstallation of the sprue eject 52, the gate 54, the product eject 56, and the rod cover 58 no longer will add to the resulting RTIR error stamped onto the optical disc 20.

The concentricity of the formatted surface 34 is now specified relative to the disc alignment mechanism 32, and does not rely on other features of the disc, such as center hole or opening 22 or the use of a hub for centering the optical disc 20 on an optical disc player drive spindle. The resulting disc alignment mechanism 32 is matable with the optical disc player drive spindle, wherein the concentricity of the formatted surface 34 is specified relative to the disc alignment mechanism 32. Additional costly processes are no longer necessary for positioning and centering a hub within the optical disc 20 opening 22 for centering the optical disc 20 relative to the formatted surface 34 on an optical disc player.

Figure 6:
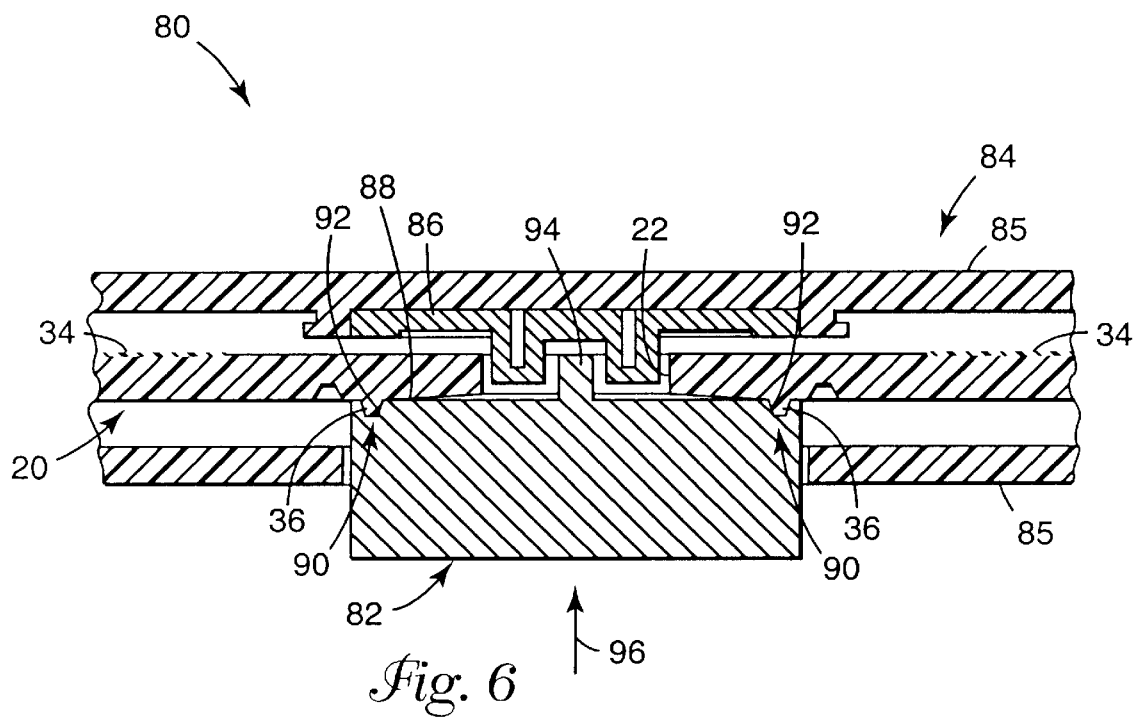
FIG. 6 is a partial cross-sectional view showing one embodiment of an optical disc assembly for use in an optical disc storage system in accordance with the present invention.

Referring to FIG. 6, an optical disc assembly 80 located on an optical disc player drive spindle 82, in accordance with the present invention, is generally shown. The optical disc assembly 80 includes cartridge 84, including cartridge shell 85, having the optical disc 20 contained therein.

Optical disc player drive spindle 82 is generally cylindrically shaped and includes a top surface 88 having spindle mechanism 90 for engaging or mating with the disc alignment mechanism 32 of the optical disc 20. In the exemplary embodiment shown, the spindle mechanism 90 includes an annular groove 92 which corresponds and mates with the annular ring 36 of the optical disc 20. In one preferred embodiment, the spindle mechanism annular groove 92 is at least 0.55 mm deep relative to the top surface of the drive spindle 82, and is shaped for mating with the disc alignment mechanism 32. A central hub portion 94 may further extend from the top surface 88.

To read optical disc 20, the optical disc assembly 80 is inserted within an optical disc player (not shown). The drive spindle 82 is operated upward (indicated by directional arrow 96) to engage or mate with the optical disc 20. In particular, the disc alignment mechanism annular ring 36 is received within the spindle mechanism annular groove 92 for engagement or mating of the optical disc 20 to the optical disc player drive spindle 82 in the normal direction.

Additional means may be provided for retaining the optical disc 20 against the drive spindle 82. In the embodiment shown, a mechanical hold-down 86, secured to the top surface of cartridge shell 85 (such as by an adhesive) is utilized to apply a force normal to the surface of optical disc 20 for magnetic attraction (coupling) and trapping of the optical disc 20 between the metallic member 86 and the drive spindle 82.

When the optical disc 20 is engaged with drive spindle 82, the central portion 94 extends through the optical disc opening 22. Since the optical disc 20 is engaged with the drive spindle 82 using disc alignment mechanism 32 and spindle mechanism 90, the central hub portion 94 is not used for engagement or registration of the optical disc 20. As such, there can be a loose fit between the central hub portion 94 and the optical disc opening 22.

The concentricity of formatted surface 34 is specified relative to annular ring 36. Further, since annular ring 36 is used for mating with the drive spindle 82, the formatted surface 34 is centered to the optical disc player drive spindle 82. Therefore, the disc alignment mechanism 32 both allows for engagement of the drive spindle 82 with the optical disc 20 and for centering the drive spindle 82 to the formatted surface 34.

Figure 7:
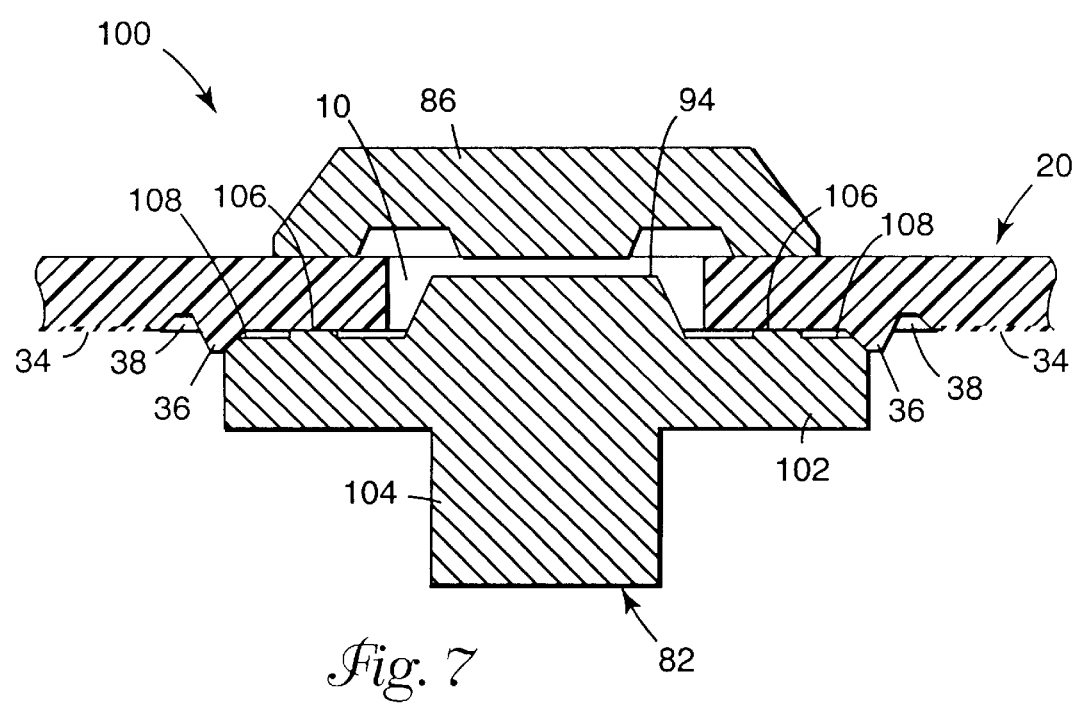
FIG. 7 is a partial cross-sectional view showing another embodiment of an optical disc assembly in accordance with the present invention.

In FIG. 7, another embodiment of low RTIR optical disc 20 coupled within an optical disc player is generally shown in partial cross section at 100 (the disc cartridge shell is not shown for clarity). Drive spindle 82 includes a flange 102 extending radially from a drive spindle body 104. Extending from flange 102 are disc contact members 106. When the optical disc 20 is engaged within the optical disc player, drive spindle 82 is operated upward to engage the optical disc 20. Additionally, a normal force is magnetically applied downward through the mechanical hold down 86, further coupling the optical disc 20 between the mechanical hold down 86 and the drive spindle 82. During engagement of optical disc 20, an outside edge 108 of the flange 102 is in precise fit/registration with the inside of annular ring 36. Further, disc contact member 106 is secured against the optical disc 20. Although the central hub portion 94 extends through the optical disc opening 22, the central hub portion 94 may be loosely fit within the optical disc opening 22.

As previously described herein, the concentricity of the formatted surface 34 (data tracks) is linked to the registration provided by annular ring 36 (formed by the inner holder 60 during the disc molding process). Further, the concentricity of the formatted surface 34 on the optical disc 20 is maintained by the precise fit of the drive spindle edge 108 with the optical disc annular ring 36.

Figure 8:
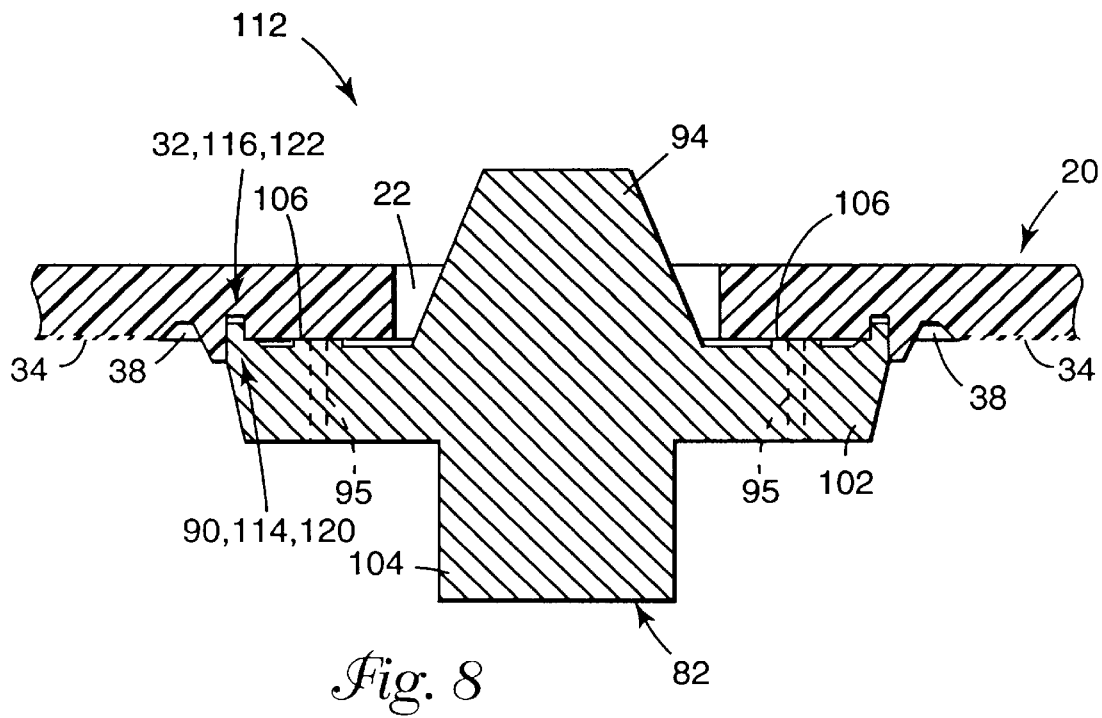
FIG. 8 is a partial cross-sectional view showing another embodiment of an optical disc assembly in accordance with the present invention.

Referring to FIG. 8, additional embodiments of the present invention are generally shown in partial cross-sectional view at 112, in which optical disc 20 is shown mated with drive spindle 82 (again, the disc cartridge is not shown for clarity). The optical disc 20 disc alignment mechanism 32 receives the spindle mechanism 90 for engagement of the optical disc 20 with the drive spindle 82. In one embodiment, the disc alignment mechanism 32 is an annular groove 116 and the spindle mechanism 90 is an annular ring 114. Alternatively, it is recognized that spindle mechanism 90 may include a mounting pin 120 which is received by corresponding mounting holes 122 within the optical disc 20. Again, since the concentricity of formatted surface 34 is registered with respect to the disc alignment mechanism 32 and the spindle mechanism 90, the central hub portion 94 may extend loosely through opening 22.

It is also recognized that other means may be provided for retaining the optical disc 20 against the drive spindle 82. For example, drive spindle 82 may further include vacuum openings 95, shown extending through the flange 102. The vacuum openings 95 are in fluid communication with a vacuum system (not shown). The vacuum system applies a force in the normal direction, for retaining/coupling the optical disc 20 against the drive spindle 82.

Figure 9:
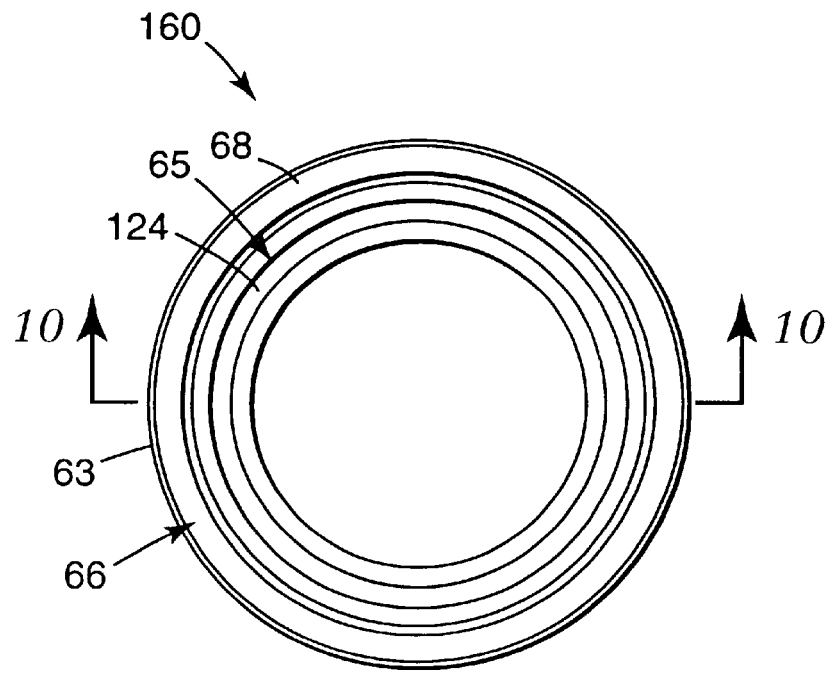
FIG. 9 is a top view of another embodiment of an inner holder in accordance with the present invention.
Figure 10:
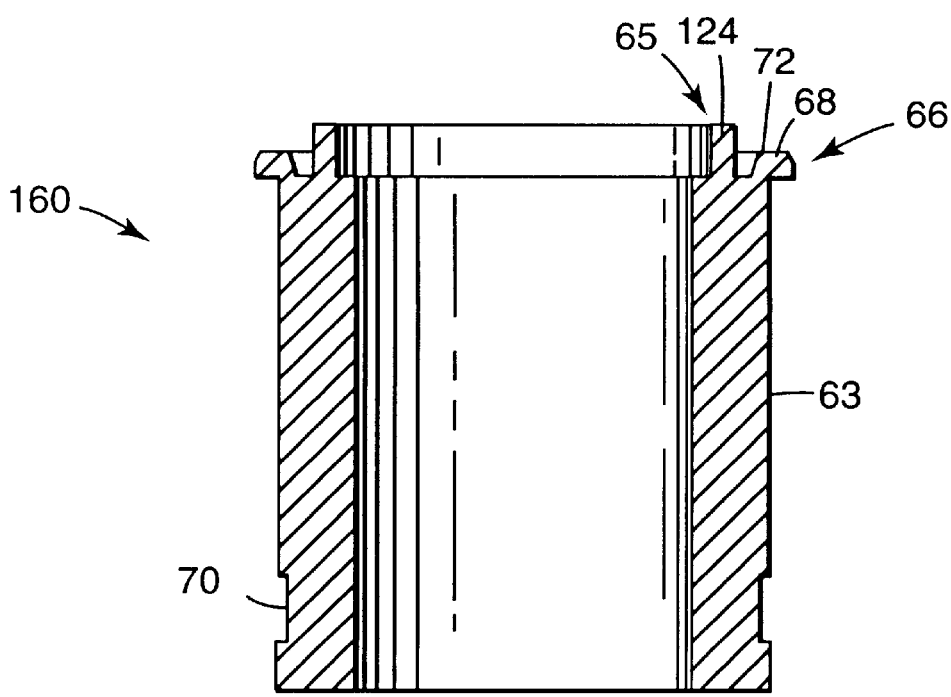
FIG. 10 is a cross-sectional view taken along line 9—9 of FIG. 9.

Referring to FIG. 9 and FIG. 10, a second embodiment of an inner holder is shown as inner holder 160 for forming an annular groove 116 within the optical disc 20 during the disc molding process (shown in FIG. 8). FIG. 9 is a top view of inner holder 60, and FIG. 10 is a cross-sectional elevational view of inner holder 60. The inner holder 60 includes annular projection 124, which corresponds to the annular ring 116 formed within the optical disc 20. In one preferred embodiment, the annular projection 124 has a height of at least 0.5 mm relative to the inner holder top surface 72.

Figure 11:
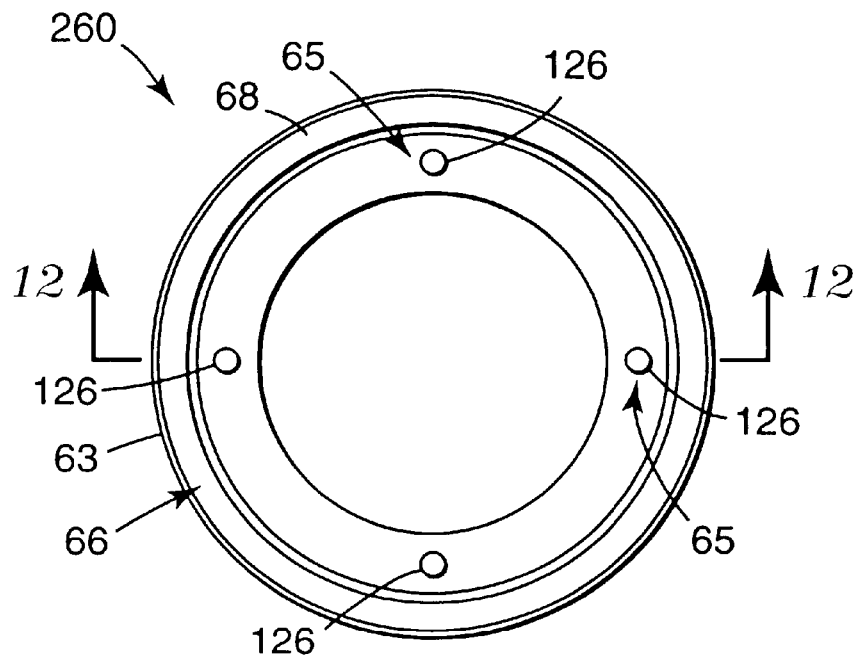
FIG. 11 is a top view of another embodiment of an inner holder in accordance with the present invention.
Figure 12:
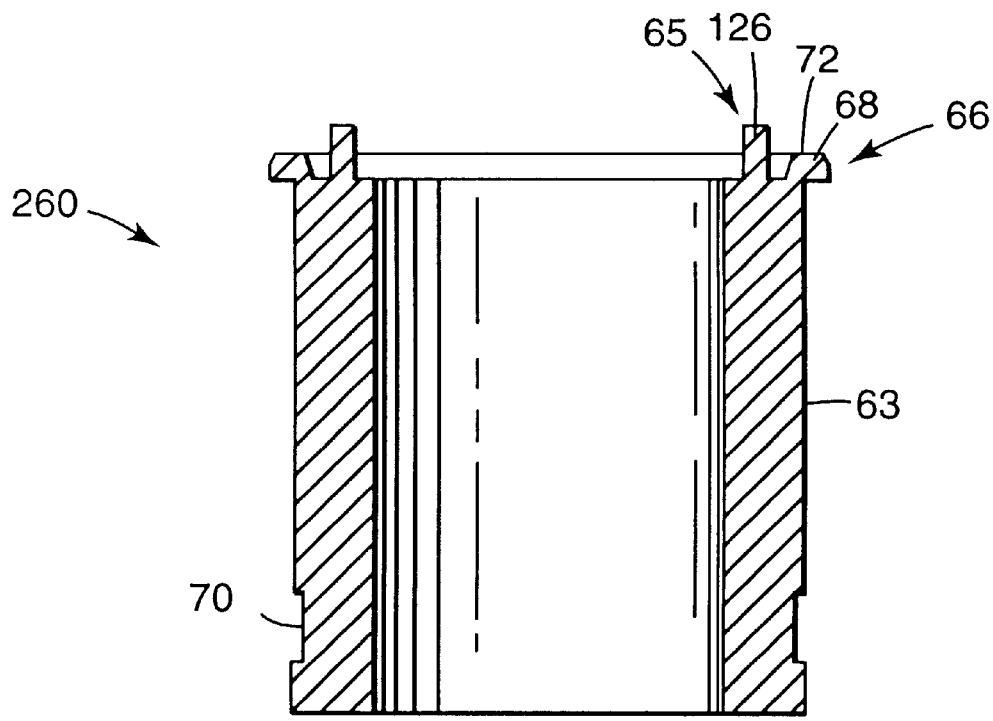
FIG. 12 is a cross-sectional view of an inner holder taken along line 12—12 of FIG. 11.

Referring to FIG. 11 and FIG. 12, a third embodiment of the inner holder is shown as inner holder 260. FIG. 11 is a top view of inner holder 260, and FIG. 12 is an elevational view of inner holder 260 shown in cross section. In this embodiment, inner holder 260 includes pins 126 for forming the mounting pin holes 122 within the optical disc 20 (shown in FIG. 8).

Figure 13:
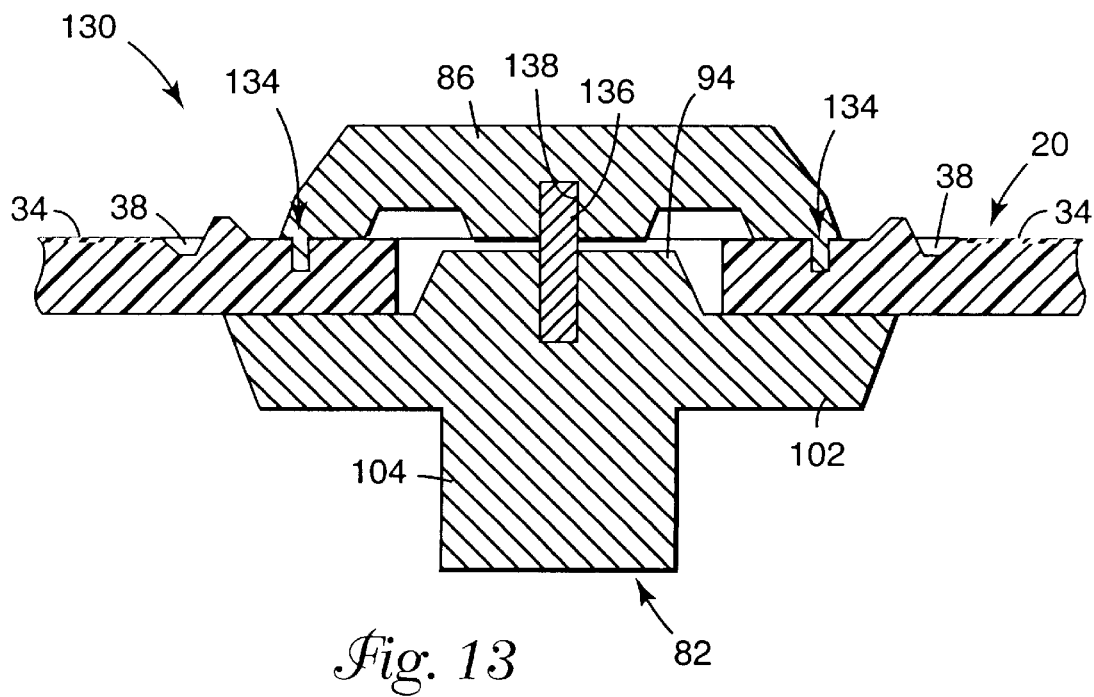
FIG. 13 is a partial cross-sectional view of another embodiment of an optical disc assembly in accordance with the present invention.

Referring to FIG. 13, another embodiment of the RTIR optical disc 20 and drive spindle assembly 82 is generally shown at 130. In this embodiment, it is recognized that the formatted surface 34 may be on the same side of the disc 20 which faces mechanical hold down 86, with the drive spindle 82 located on an opposite side of the optical disc 20. In this embodiment, mechanical hold down 86 includes coupling mechanisms 134, which can be similar to the spindle mechanisms 90 which have been previously described herein, for mating or engaging the mechanical hold down 86 with the optical disc 20. The drive spindle 82 further includes a spindle pin 136 secured within opening 138 (such as by an adhesive). The spindle pin 136 extends from the drive spindle 82 and is securely tolerance fit to the mechanical hold-down 86 for coupling the drive spindle 82 to the mechanical hold-down 86. Further, the mechanical hold-down may be mechanically coupled to drive spindle 82 using techniques as previously described herein. In operation, as drive spindle 82 is rotated, since mechanical hold down 86 is directly coupled to the drive spindle 82, the mechanical hold-down 86 is also rotated, for rotating optical disc 20.

Figure 14:
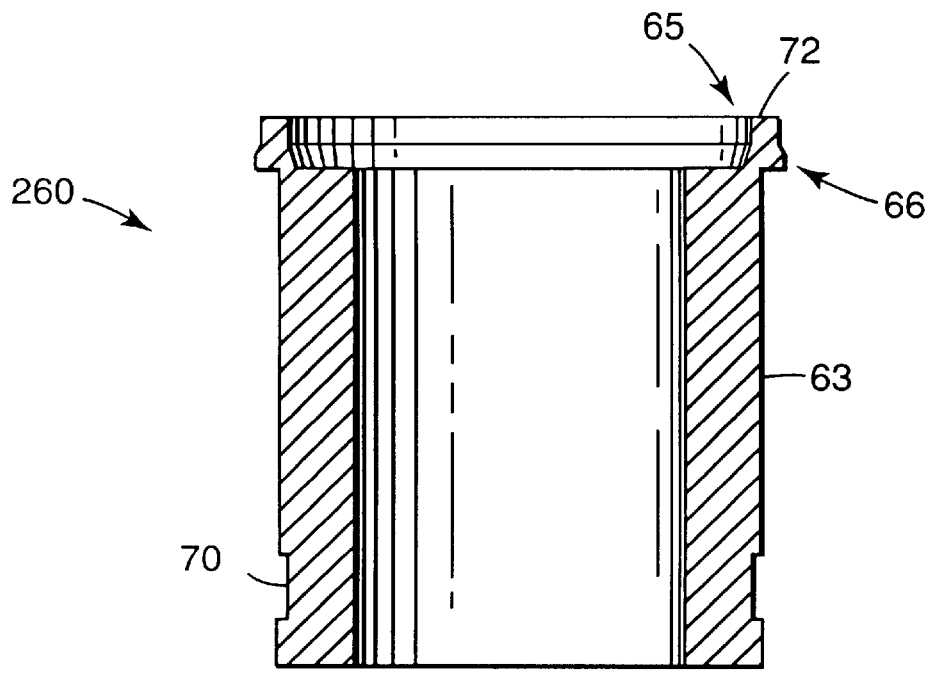
FIG. 14 is a cross-sectional view of another embodiment of an inner holder in accordance with the present invention.

In FIG. 14, a fourth embodiment of the inner holder is shown as inner holder 260. In this embodiment, the shape imparting mechanism 65 is formed integral the locking mechanism 66. As previously described herein, the shape imparting mechanism 65 includes an annular raised portion or ridge, and the locking mechanism 66 extends beyond a side wall of the inner holder 360. The inner holder 360 is removable from the optical tool 42 for allowing the stamper 62 to be changed out. In a locked position, the locking mechanism 66 extends over an edge of the stamper 62, securely retaining the stamper 62 in place. The shape of the top surface 72 is reflected into the optical disc substrate 24 during the disc holding process. As such, in contrast to a conventional disc locking mechanism, the shape and size of locking mechanism 66 must be such that it forms a shape or groove into the optical disc substrate 24 which is capable of functioning as a disc alignment mechanism and capable of mating with an optical disc player drive spindle. In one preferred embodiment, the disc locking mechanism extends at least 0.5 mm above the top surface 72 of inner holder 260.

Figure 15:
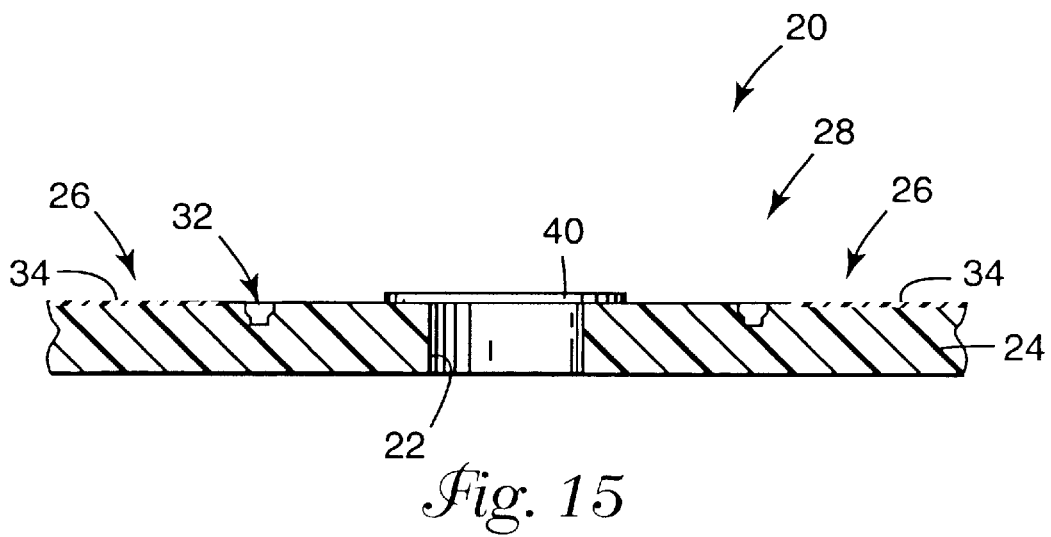
FIG. 15 is a partial cross-sectional view of an optical disc in accordance with the present invention formed using the inner holder of FIG. 14.

In FIG. 15, one exemplary embodiment of an optical disc is shown, formed using inner holder 260 in a disc molding process. The inner holder 260 is utilized for forming the disc alignment mechanism 32 within the optical disc substrate 24. The disc alignment mechanism 32 is replicated into the optical disc substrate 24 using the inner holder shape imparting mechanism 65 which is formed integral the locking mechanism 66. The resulting disc alignment mechanism 32 is shaped and sized such that it is capable of mating or coupling with an optical disc drive spindle, for centering the generally concentric data tracks on the formatted surface 341 on the drive spindle. It is also recognized that the shape imparting mechanism 65 may be formed as part of the disc stamper, or from other disc molding parts. In one preferred embodiment, the disc alignment mechanism 32 has a depth of at least 0.5 mm relative to the disc substrate 24 surface.

The hubless optical disc having a low radial runout in accordance with the present invention is useful for very high capacity optical discs. The high density optical disc in accordance with the present invention has a low RTIR error which does not require the use of a hub for centering the information on the disc. The high density optical disc may be mounted and centered on features integrally molded onto the plastic substrate of the disc. With the present invention, optical discs having an information capacity of 20 gigabytes or greater may be manufactured and used due to the low introduction of RTIR error into the disc substrate by utilizing the disc alignment mechanism for centering data tracks to a drive spindle, in accordance with the present invention.

Numerous characteristics and advantages of the invention have been set forth in the foregoing description. It will be understood, of course, that this disclosure is, and in many respects, only illustrative. Changes can be made in details, particularly in matters of shape, size and arrangement of parts without exceeding the scope of the invention. The invention scope is defined in the language in which the appended claims are expressed.

What is claimed:

1. A hubless optical disc for the storage of information therein, the optical disc comprising:

a disc substrate having a formatted surface, an intermediate region and a central portion, wherein the formatted surface includes a plurality of generally concentric tracks, and wherein each track can be defined as a concentric ring or a cycle of a spiral track, and wherein the central portion is proximate the center of the disc substrate and the intermediate region is between the formatted surface and the central portion; and wherein the intermediate region includes a disc alignment mechanism such that the concentric registration of the formatted surface is specified relative to the disc alignment mechanism, including a first annular planar area extending to a first non-planar region followed by a second non-planar region, wherein the first non-planar region is an annular raised area and wherein the second non-planar region is an annular grooved area.

2. The hubless optical disc of claim 1, further wherein the disc alignment mechanism is integrally molded within the disc substrate.

3. The hubless optical disc of claim 1, further wherein the disc alignment mechanism is formed separate from the disc substrate, and coupled to the disc substrate.

4. The hubless optical disc of claim 1, wherein the disc alignment mechanism is matable with an optical disc player drive spindle.

5. The hubless optical disc of claim 1, further comprising a second annular planar area between the first non-planar area and the second non-planar area.

6. The hubless optical disc of claim 1, wherein the disc alignment mechanism includes a plurality of holes in the disc substrate.

7. The hubless optical disc of claim 1, further comprising a center hole in the disc substrate.

8. The hubless optical disc of claim 7, wherein the center hole is in the central portion of the disc substrate.

9. The hubless optical disc of claim 7, wherein the optical disc further comprises means for aiding in coupling the optical disc to an optical disc player drive spindle, wherein the means for coupling is secured across the center hole.

10. A hubless optical disc capable of storage of a high capacity of information, the hubless optical disc having a low radial total indicated runout error, the hubless optical disc comprising:

a generally disc shaped substrate having a center hole, the disc substrate including a formatted information area and an intermediate region, wherein the intermediate region is located between the center hole and the formatted information area; and means located within the intermediate region for concentric registration of the formatted information area, including a disc alignment mechanism wherein the concentric registration of the formatted information area is specified relative to the disc alignment mechanism, including a first non-planar region followed by a second non-planar region, wherein the first non-planar region is an annular raised area and wherein the second non-planar region is an annular grooved area.

11. The hubless optical disc capable of claim 10, wherein the means for concentric registration of the formatted information area is matable with an optical disc player drive spindle.

12. The hubless optical disc of claim 10, further wherein the means for concentric registration is integrally molded within the disc substrate.

13. The hubless optical disc of claim 10, further wherein the means for concentric registration is formed separate from the disc substrate, and coupled to the disc substrate.

14. The hubless optical disc of claim 10, further comprising an annular planar area between the first non-planar area and the second non-planar area.

15. The hubless optical disc of claim 10, wherein the disc alignment mechanism includes a plurality of holes in the disc substrate.

16. The hubless optical disc of claim 10, wherein the optical disc further comprises means for aiding in coupling the optical disc to an optical disc player drive spindle, wherein the means for coupling is secured across the center hole.

17. A hubless optical disc capable of storage of a high capacity of information, the hubless optical disc comprising:

a disc substrate having a center hole, the disc substrate including a formatted surface and an intermediate region, wherein the intermediate region is located between the center hole and the formatted surface; and the formatted surface located within the disc substrate capable of containing data therein, including a plurality of data tracks, the formatted surface having a track pitch in the range from 0.35 microns to less than 0.40 microns, and a low radial total indicated runout error of less than 50 microns; and means located within the intermediate region for concentric registration of the formatted surface, including a disc alignment mechanism wherein the concentric registration of the formatted surface area is specified relative to the disc alignment mechanism, including a first non-planar region followed by a second non-planar region, wherein the first non-planar region is an annular raised area and wherein the second non-planar region is an annular grooved area.

18. The hubless optical disc of claim 17, wherein the radial total indicated runout error is less than 30 microns.

19. The hubless optical disc of claim 18, wherein the track pitch is 0.35 microns.

20. The hubless optical disc of claim 17, wherein each data track is defined as a cycle of a continuous spiral track.

21. The hubless optical disc of claim 17, wherein each data track is defined as a concentric track.

22. The hubless optical disc of claim 17, wherein the disc capacity is greater than 20 gigabytes.

23. A hubless optical storage system including an optical disc drive and an optical media having a low radial total indicated runout, the optical storage system, wherein the optical media comprises:

a disc substrate having a formatted surface, an intermediate region and a central portion, wherein the central portion is proximate the center of the disc substrate and the intermediate region is between the formatted surface and the central portion; and wherein the intermediate region includes a disc alignment mechanism such that the concentric registration of the formatted surface is specified relative to the disc alignment mechanism, including a first non-planar region followed by a second non-planar region, wherein the first non-planar region is an annular raised area and wherein the second non-planar region is an annular grooved area; and wherein the drive comprises a drive spindle having a mating mechanism for mating the drive with the optical media, the mating mechanism including a coupling mechanism formed on the drive spindle capable of mating with the disc alignment mechanism.

24. The optical storage system of claim 23, wherein the coupling mechanism includes an annular groove capable of receiving the annular raised area.

25. The optical storage system of claim 23, wherein the coupling mechanism includes an annular ridge, and the annular grooved area is capable of receiving the annular ridge.

26. The optical storage system of claim 23, further comprising a mechanical hold-down, wherein the disc substrate is interposed between the drive spindle and the mechanical hold-down.

27. The optical storage system of claim 23, wherein the mechanical hold-down applies a force normal to the disc substrate.

28. The optical storage system of claim 23, further comprising means coupled to the mechanical hold-down for applying a force normal to the disc substrate.

29. The optical storage system of claim 28, wherein the force is an electromagnetic force.

30. The optical storage system of claim 23, further comprising a vacuum mechanism for urging the disc substrate towards the drive spindle.

31. The optical storage system of claim 30, wherein the vacuum mechanism includes an opening in the drive spindle.

32. A drive spindle for use in an optical disc drive assembly, the drive spindle comprising:

a generally cylindrical shaped body; and means coupled to the generally cylindrical shaped body for engaging an optical disc, the means for engaging having a mating mechanism, wherein the optical disc includes a formatted surface and a disc alignment mechanism, the disc alignment mechanism including a first non-planar region followed by a second non-planar region, wherein the first non-planar region is an annular raised area and wherein the second non-planar region is an annular grooved area, the concentricity of the formatted surface being specified relative to the disc alignment mechanism, and wherein the mating mechanism is engagable with the disc alignment mechanism.

33. The drive spindle of claim 32, further comprising a central hub extending from the generally cylindrical shaped body for extending through a center opening in the optical disc.

34. The drive spindle of claim 32, further comprising a flange extending from the generally cylindrical shaped body, wherein the means for engaging an optical disc is coupled to the flange.

35. The drive spindle of claim 32, wherein the means for engaging is formed integral with the generally cylindrical shaped body.

36. The drive spindle of claim 32, wherein the means for engaging includes an annular ring formed thereon.

37. The drive spindle of claim 32, wherein the means for engaging includes an annular groove formed therein.

38. The drive spindle of claim 32, wherein the means for engaging includes a plurality of pins extending therefrom.

* * * * *